United States Patent [19]

Amano et al.

[11] Patent Number: 5,836,354
[45] Date of Patent: Nov. 17, 1998

[54] HYDRAULIC PRESSURE CONTROLLER AND RESERVOIR WATER-PROOFING STRUCTURE

[75] Inventors: Tsutomu Amano; Naotoshi Tamai; Takashi Aoki; Takaomi Shirase, all of Nagano, Japan

[73] Assignee: Nissin Nogyo Co., Ltd., Nagano, Japan

[21] Appl. No.: 731,913

[22] Filed: Oct. 22, 1996

[30] Foreign Application Priority Data

Oct. 23, 1995 [JP] Japan ..................................... 7-274580
Oct. 23, 1995 [JP] Japan ..................................... 7-274581

[51] Int. Cl.⁶ .............................. F16K 11/02; B60T 8/32
[52] U.S. Cl. .................. 137/884; 251/129.15; 303/119.2
[58] Field of Search ..................................... 137/560, 884; 251/129.15; 303/119.1, 119.2

[56] References Cited

U.S. PATENT DOCUMENTS

| 4,568,026 | 2/1986 | Baun ..................................... 137/884 X |
| 4,898,360 | 2/1990 | Von Hayn et al. ............. 251/129.15 X |
| 4,929,038 | 5/1990 | Reinartz et al. ..................... 137/884 X |
| 5,127,440 | 7/1992 | Maas et al. ............................... 137/884 |
| 5,275,478 | 1/1994 | Schmitt et al. ..................... 137/884 X |
| 5,385,396 | 1/1995 | Beck et al. ............................ 303/119.2 |
| 5,439,279 | 8/1995 | Linker et al. ........................ 303/119.2 |
| 5,449,019 | 9/1995 | Hara ..................................... 137/884 X |
| 5,449,227 | 9/1995 | Steinberg et al. ............. 251/129.15 X |
| 5,452,948 | 9/1995 | Cooper et al. ....................... 137/884 X |
| 5,462,344 | 10/1995 | Jakob et al. ......................... 137/884 X |
| 5,466,055 | 11/1995 | Schmitt et al. ..................... 137/884 X |
| 5,474,108 | 12/1995 | Inden et al. .............................. 137/884 |
| 5,611,372 | 3/1997 | Bauer et al. ............................. 137/884 |

FOREIGN PATENT DOCUMENTS 6-40402 5/1994 Japan .
7-156771 6/1995 Japan .

*Primary Examiner*—John Rivell
*Attorney, Agent, or Firm*—Whitham, Curtis & Whitham

[57] ABSTRACT

A hydraulic pressure controller includes: a base; an electromagnetic valve mounted on the base and including a guide cylinder protruding from the base, a coil unit having a bobbin surrounding the guide cylinder and a coil wound on the bobbin, and a magnetic path forming frame connecting magnetically a first end and a second end of the guide cylinder; a reservoir and a damper arranged with the electromagnetic valve on the base; and a cover covering the electromagnetic valve, the reservoir and the damper, in which the cover includes a frame coupled to the base, the frame surrounding the electromagnetic valve, and a skirt portion formed integrally with the frame, the skirt portion covering the reservoir and the damper. The hydraulic pressure controller is light in weight and is improved in assembling efficiency. The hydraulic pressure controller has a reservoir water-proofing structure which is capable of preventing water from entering an outside air communicating chamber of the reservoir.

6 Claims, 7 Drawing Sheets

HYDRAULIC PRESSURE CONTROLLER AND RESERVOIR WATER-PROOFING STRUCTURE

BACKGROUND OF THE INVENTION

The present invention relates to a hydraulic pressure controller having a plurality of electromagnetic valves, reservoirs and dampers which are arranged on a face of the base in such a manner that they are located on one side of those electromagnetic valves. In addition, the present invention relates to a reservoir water-proofing structure in the hydraulic pressure controller in which the structure prevents the entrance of water or dust into the outside air communicating chambers of the reservoirs.

Generally, in the hydraulic pressure controller, the electromagnetic valves include: a plurality of valve housings which have guide cylinders protruded from a face of a base and which are arranged in two lines on the base; coils wound on bobbins which surround the guide cylinder, respectively; and magnetic-path forming frames which magnetically couple the front ends and the base ends of the guide cylinders to each other.

Further, the reservoirs include: pistons which are slidably fitted in bottomed reservoir holes and formed in a base in such a manner that the bottomed reservoir holes are opened in a face of the base, while forming reservoirs chambers with the closed ends of the reservoir holes; plug members which are fitted in the openings of the reservoir holes, and form outside air communicating chambers with the pistons, and have ventilating holes which are communicated with the outside air communicating chambers, return springs set in the outside air communicating chambers to urge the pistons so as to reduce the volumes of the reservoir chambers; and seal members which are fitted in the openings of the reservoir holes in such a manner that the seal member prevent the entrance of water into the outside air communicating chambers, and permit the breathing of the outside air communicating members through the ventilating holes; and a plurality of electromagnetic valves which are fitted in the base in such a manner that the electromagnetic valves are partially protruded from the face of the base.

A conventional hydraulic pressure controller of this type has been disclosed, for instance, by Unexamined Japanese Patent Publication No. 156771/1995.

The conventional hydraulic pressure controller is so designed that a plurality of bobbins on which the coils are wound, and magnetic-path forming frames are coupled to a retaining plate made of magnetic metal are coupled to a face of the base, and a cover of synthetic resin is fastened to the retaining plate. With the hydraulic pressure controller thus designed, the retaining plate is relatively large in weight, and therefore the device itself is relatively large in weight. Further, in the device, it is necessary to perform not only the operation of fastening the retaining plate to the base but also the operation of coupling the cover to the retaining plate. Accordingly, the device is low in assembling efficiency.

On the other hand, a conventional reservoir water-proofing structure of this type has been disclosed by Unexamined Japanese Utility Model Publication No. 40402/1994. In the structure, a seal member which cooperates with a plug member or the base of the device to form a one-way valve, has a shaft at the center, and the shaft is engaged with the plug member so that the seal member is fixedly arranged outside the plug member.

In the above-described conventional reservoir water-proofing structure, the seal member is exposed. When the base is wetted by water, the water on the seal member enters the outside air communicating chamber through the plug member during the breathing time when the one-way valve is opened. Therefore, the conventional structure is incomplete for water-proofing function in the reservoir.

SUMMARY OF THE INVENTION

An object of the invention is to provide a hydraulic pressure controller which is light in weight and is improved in assembling efficiency. Another object of the-invention is to provide a reservoir water-proofing structure in the hydraulic pressure controller which is capable of preventing water from entering an outside air communicating chamber of the reservoir.

The foregoing object of the invention has been achieved by the provision of a hydraulic pressure controller including a base; an electromagnetic valve mounted on the base and including a guide cylinder protruding from the base, a coil unit having a bobbin surrounding the guide cylinder and a coil wound on the bobbin, and a magnetic path forming frame connecting magnetically a first end and a second end of the guide cylinder; a reservoir and a damper arranged with the electromagnetic valve on the base; and a cover covering the electromagnetic valve, the reservoir and the damper, in which the cover includes a frame coupled to the base, the frame surrounding the electromagnetic valve, and a skirt portion formed integrally with the frame, the skirt portion covering the reservoir and the damper.

Further, the foregoing object of the invention have been achieved by the provision of a water-proofing structure of the reservoir which includes a plug member fitted in the reservoir hole, the plug member having an air communicating chamber between the piston and the plug member and a ventilating hole communicated with the air communicating chamber; and a seal member fitted in a reservoir hole of the base to prevent water from entering the air communicating chamber and to permit air to enter the air communicating chamber, in which the seal member includes a ventilating pipe having a first pipe end which is connected to the ventilating hole and a second pipe end which is opened in a second side opposite to the first side.

DETAILED DESCRIPTION OF THE PREFERRED EMBODIMENTS

A preferred embodiment of the invention will be described with reference to the accompanying drawings.

Figure 1:
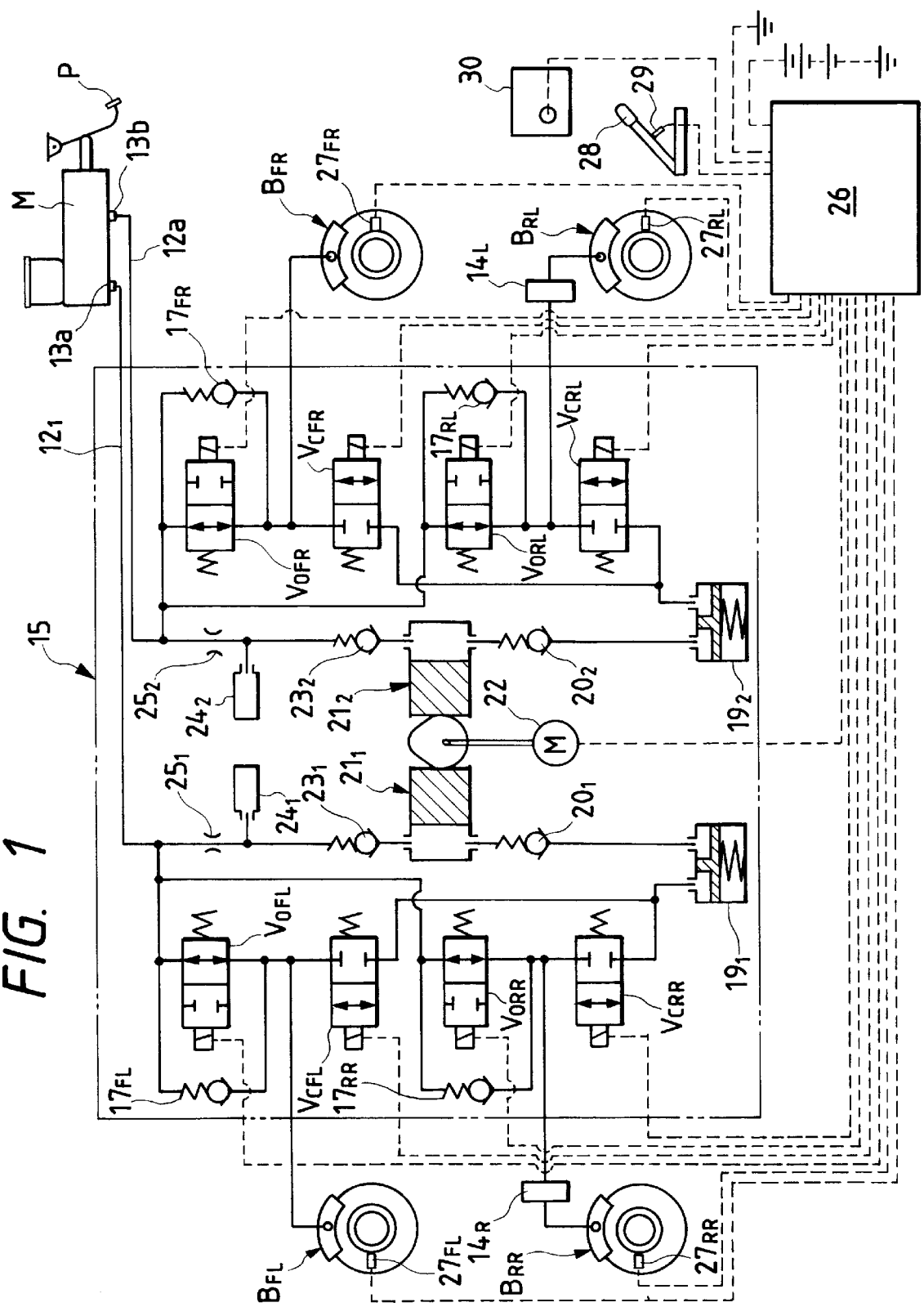
FIG. 1 is a diagram showing a hydraulic pressure circuit in a vehicle braking system according to the invention.

FIGS. 1 through 8 shows an example of a hydraulic pressure controller, which constitutes the embodiment of the invention. As shown in FIG. 1, a tandem type master cylinder M has a pair of output ports $13_1$ and $13_2$ which output a braking hydraulic pressure corresponding to the degree of depression of a brake pedal P. A hydraulic pressure controller 15 is interposed between a proportional pressure reducing valve $14_R$ which is connected to the front left wheel brake $B_{FL}$ and the rear right wheel brake $B_{RR}$ and a proportional pressure reducing valve $14_L$ which is connected to the front right wheel brake $B_{FR}$ and the rear left wheel brake $B_{RL}$, and hydraulic pressure lines $12_1$ and $12_2$ connected to the output ports $13_1$, $13_2$, respectively.

The hydraulic pressure controller 15 includes: four normally opened electromagnetic valves $V_{OFL}$, $V_{ORR}$, $V_{OFR}$ and $V_{ORL}$ which are provided for the front left wheel brake $B_{FL}$, the rear right wheel brake $B_{RR}$, the front right wheel brake $B_{FR}$, and the rear left wheel brake $B_{RL}$, respectively; four check valves $17_{FL}$, $17_{RR}$, $17_{FR}$ and $17_{RL}$ which are connected in parallel to the above-described normally open electromagnetic valves $V_{OFL}$ through $V_{ORL}$, respectively; four normally closed electromagnetic valves $V_{CFL}$, $V_{CRR}$, $V_{CFR}$ and $V_{CRL}$; a pair of reservoirs $19_1$ and $19_2$ which are provided respectively on the side of the front left wheel brake $B_{FL}$ and the rear right wheel brake $B_{RR}$ a and on the side of the front right wheel brake $B_{FR}$ and the rear left wheel brake $B_{RL}$; a pair of reciprocation type plunger pumps $21_1$ and $21_2$ which are connected through suction valves $20_1$ and $20_2$ to those reservoirs $19_1$ and $19_2$, respectively; a single electric motor 22 which is provided for both of the plunger pumps $21_1$ and $21_2$; a pair of dampers $24_1$ and $24_2$ which are connected through a pair of discharge valves $23_1$ and $23_2$ to the plunger pumps $21_1$ and $21_2$, respectively; and a pair of orifices $25_1$ and $25_2$ which are interposed between the aforementioned hydraulic pressure paths $12_1$ and $12_2$ which are connected to the output ports $13_1$ and $13_2$ of the master cylinder M and the dampers $24_1$ and $24_2$, respectively. The demagnetization and excitation of the normally opened electromagnetic valves $V_{OFL}$ through $V_{ORL}$ and the normally closed electromagnetic valves $V_{CFL}$ through $V_{CRL}$ are controlled by an electronic control unit 26.

The normally opened electromagnetic valve $V_{OFL}$ is connected between the front left wheel brake $B_{FL}$ and the hydraulic pressure path $12_1$ which is connected to the output port $13_1$ of the master cylinder M; the normally opened electromagnetic value $V_{ORR}$ is connected between the hydraulic pressure path $12_1$ and the proportional pressure reducing valve $14_R$ which is connected to the right rear wheel brake $B_{RR}$; the normally opened electromagnetic valve $V_{OFR}$ is connected between the front right wheel brake $B_{FR}$ and the hydraulic pressure path $12_2$ which is connected to the output port $13_2$ of the master cylinder M; and the normally opened electromagnetic valve $V_{ORL}$ is connected between the hydraulic pressure path $12_2$ and the proportional pressure reducing valve $14_L$ which is connected to the rear left wheel brake $B_{RL}$. The check valves $17_{FL}$ through $17_{RL}$ are connected in parallel to the normally opened electromagnetic valves $V_{OFL}$ through $V_{OFR}$ in such a manner as to permit the flow of the operating fluids from the corresponding wheel brakes $B_{FL}$ through $B_{RL}$, respectively.

The normally closed electromagnetic valve $V_{CFL}$ is connected between the front left wheel brake $B_{FL}$ and the reservoir $19_1$; the normally closed electromagnetic valve $V_{CRR}$ is connected between the proportional pressure reducing valve $14_R$ and the reservoir $19_1$; the normally closed electromagnetic valve $V_{CFR}$ is connected between the front right wheel brake $B_{FR}$ and the reservoir $19_2$; and the normally closed electromagnetic valve $V_{CRL}$ is connected between the proportional pressure reducing valve $14_L$ and the reservoir $19_2$.

With the hydraulic pressure controller 15, during the ordinary braking operation which is free from the difficulty that the wheels are locked, the normally opened electromagnetic valves $V_{OFL}$ through $V_{ORL}$ are kept opened being demagnetized, while the normally closed electromagnetic valves $V_{CFL}$ through $V_{CRL}$ are kept closed being demagnetized. Hence, the braking fluid outputted from the one output port $13_1$ of the master cylinder M acts on the front left wheel brake $B_{FL}$ through the normally opened electromagnetic valve $V_{OFL}$ and on the rear right wheel brake $B_{RR}$ through the normally opened electromagnetic valve $V_{ORR}$ and the proportional pressure reducing valve $14_R$; while the braking fluid outputted from the other output port $13_2$ of the master cylinder M acts on the front right wheel brake $B_{FR}$ through the normally opened electromagnetic valve $V_{OFR}$ and on the rear left wheel brake $B_{RL}$ through the normally opened electromagnetic valve $V_{ORL}$ and the proportional pressure reducing valve $14_L$.

At the time of anti-lock control that the wheels are going to be locked during the braking operation, the normally opened electromagnetic valves provided for the wheels which are going to be locked are excited so as to be closed, while the normally closed electromagnetic valve provided for the same wheels (which are going to be locked) are excited so as to be opened. As a result, the braking fluid is partially run into the reservoir $19_1$ or $19_2$; that is, the braking hydraulic pressure is reduced. On the other hand, in order to maintain the braking hydraulic pressure, the normally opened electromagnetic valves $V_{OFL}$ through $V_{ORL}$ are excited so as to be closed, while the normal closed electromagnetic valves $V_{CFL}$ through $V_{CRL}$ are demagnetized so as to be opened. In order to increase the braking hydraulic pressure, the normally opened electromagnetic valves $V_{OFL}$ through $V_{ORL}$ are demagnetized so as to be opened, while the normal closed electromagnetic valves $V_{CFL}$ through $V_{CRL}$ are demagnetized so as to be closed.

The motor 22 adapted to operate both of the plunger pumps $21_1$ and $21_2$ is driven at the time of anti-clock control. That is, when the motor 22 is operated, the operating fluid run into the reservoirs $19_1$ and $19_2$ is returned through the plunger pumps $21_1$ and $21_2$, the dampers $24_1$ and $24_2$, and the orifices $25_1$ and $25_1$ to the upstream side of the normally opened electromagnetic valves $V_{OFL}$ through $V_{ORL}$; i.e., to the hydraulic pressure paths $12_1$ and $12_2$. Hence, even if the operating fluid partially runs into the reservoirs $19_1$ and $19_2$, in the master cylinder M the amount of depression of the brake pedal P is not increased. In addition, the pulsation of the operating fluid is damped by the dampers $24_1$ and $24_2$ and the orifices $25_1$ and $25_2$; that is, the pulsation of the brake pedal P is attenuated.

The electronic control unit 26 adapted to control the demagnetization and excitation of the normally opened electromagnetic valves $V_{OFL}$ through $V_{ORL}$ and the normally closed electromagnetic valves $V_{CFL}$ through $V_{CRL}$ receives detection signals from wheel: speed sensors $27_{FL}$, $27_{RR}$, $27_{FR}$ and $27_{RL}$ to individually detect the speeds of the four wheels thereby to determine whether or not the wheels are going to be locked, and further receives a detection signal from a hand brake detecting sensor 29 which is adapted to detect whether or not a hand brake 28 is operated. In addition, the electronic control unit 26 is connected to an alarm such as a lamp, so that the lamp is activated by the control unit 26 at the time of anti-lock control.

As described above, the hydraulic pressure controller includes: the four normally opened electromagnetic valves $V_{OFL}$ through $V_{ORL}$, the four check valves $17_{FL}$ through $17_{RL}$, the four normally closed electromagnetic valves $V_{CFL}$ through $V_{CRL}$, the pair of reservoirs $19_1$ and $19_2$, the pair of suction valves $20_1$ and $20_2$, the pair of plunger pumps $21_1$ and $21_2$, the motor 22, the pair of discharge valves $23_1$ and $23_2$, the pair of dampers $24_1$ and $24_2$, and the pair of orifices $25_1$ and $25_2$. All of those components are arranged in a base 34 shown in FIG. 2.

The base 34 is in the form of a block formed with metal material such as aluminum alloy. The base 34 is mounted on a bracket 32 of the vehicle body (not shown) with a plurality of mounting devices 33 in such a manner that a face 34a of the base 34 is held vertical.

Figure 2:
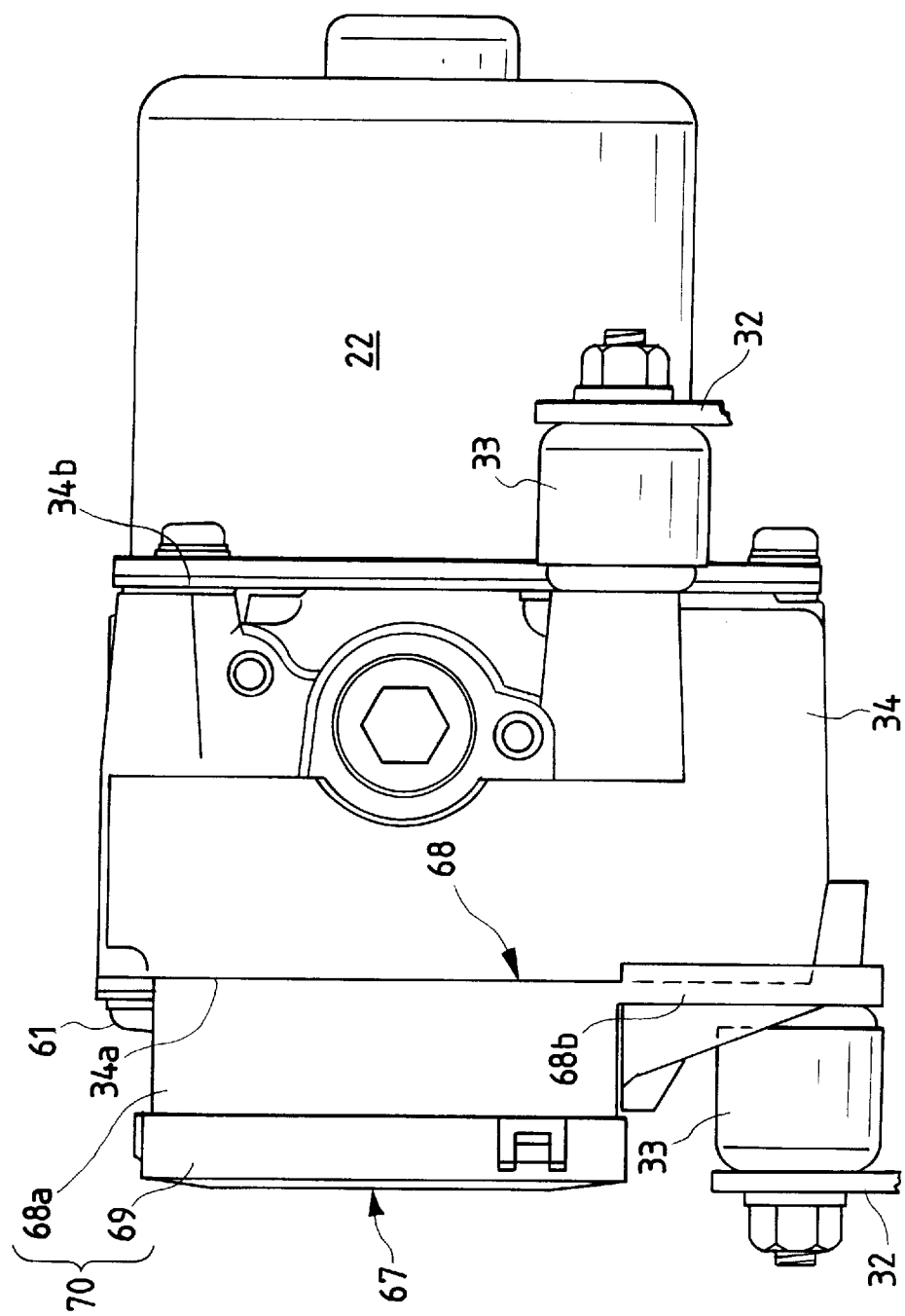
FIG. 2 is a side view of a hydraulic pressure controller, which constitutes a preferred embodiment of the invention.
Figure 3:
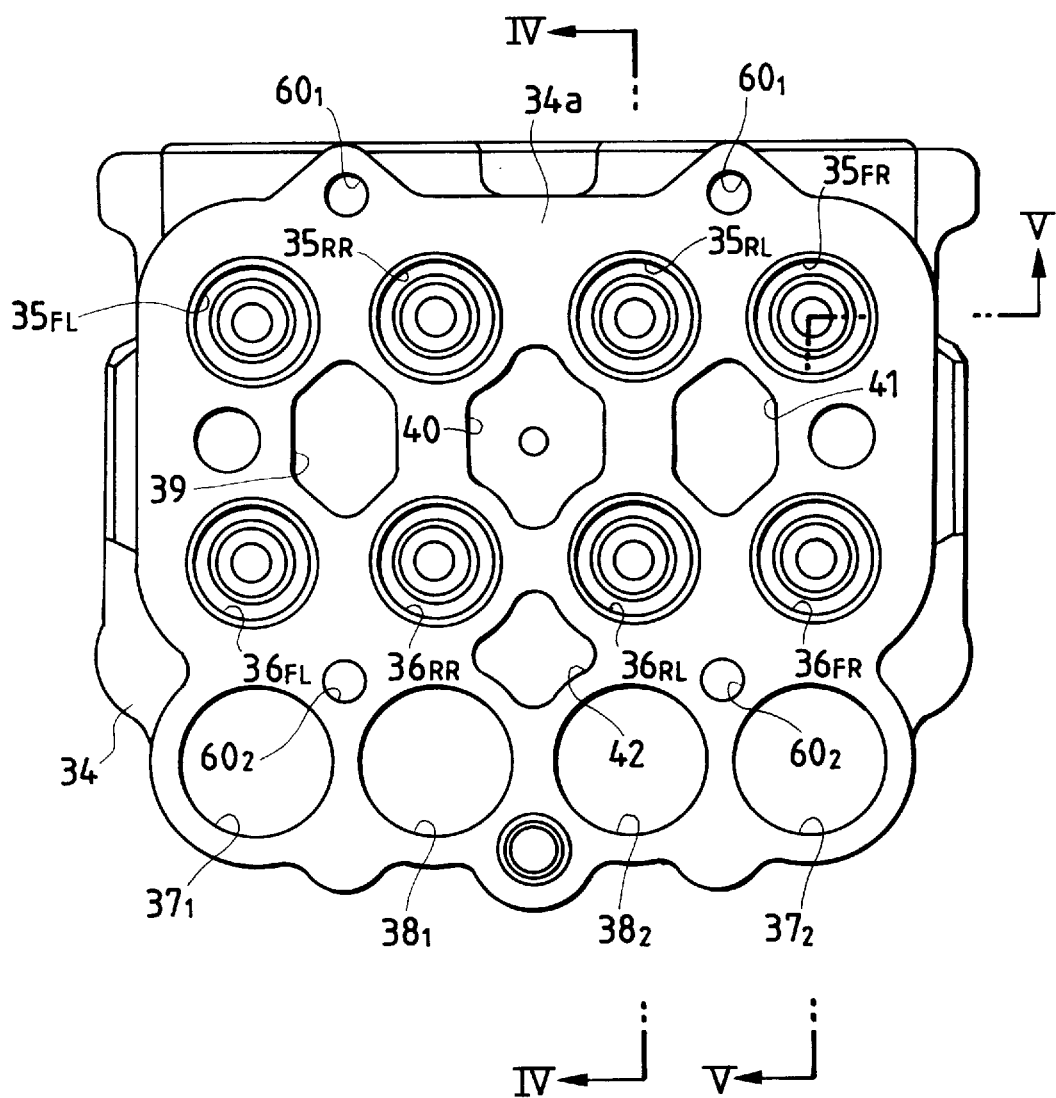
FIG. 3 is a front view of the base of the hydraulic pressure controller.

As shown in FIGS. 2 and 3, four engaging recesses $35_{FL}$, $35_{RR}$, $35_{RL}$ and $35_{FR}$, and four engaging recesses $36_{FL}$, $36_{RR}$, $36_{RL}$ and $36_{FR}$ are formed in the face 34a of the base in parallel to each other. Further, in the face 34a of the base 34, a bottomed damper hole $37_1$ is formed in correspondence to the engaging recesses $35_{FL}$ and $36_{FL}$, a bottomed reservoir hole $38_1$ is formed in correspondence to the engaging recesses $35_{RR}$ and $36_{RR}$, a bottomed damper hole $37_2$ is formed in correspondence to the engaging recesses $35_{FR}$ and $36_{FR}$, and a bottomed reservoir hole $38_2$ is formed in correspondence to the engaging recesses $35_{FR}$ and $36_{FR}$, in such a manner that they are located below the engaging recesses $35_{FL}$ through $35_{FR}$ and the engaging recesses $36_{FL}$ through $36_{FR}$ and are in parallel with the lines in which those engaging recesses are arranged. Moreover, in the face 34a, four lightening recesses 39, 40, 41 and 42 are formed as follows: The lightening recess 39 is located among the engaging recesses $35_{FL}$, $35_{RR}$, $36_{FL}$ and $36_{RR}$, the lightening recess 40 is located among the engaging recesses $35_{RR}$, $35_{RL}$, $36_{RR}$ and $36_{RL}$, the lightening recess 41 is located among the engaging recesses $35_{RL}$, $35_{FR}$, $36_{RL}$ and $36_{FR}$, and the lightening recess 42 is located among the engaging recesses $35_{RR}$ and $36_{RL}$ and the reservoirs $38_1$ and $38_2$.

Figure 4:
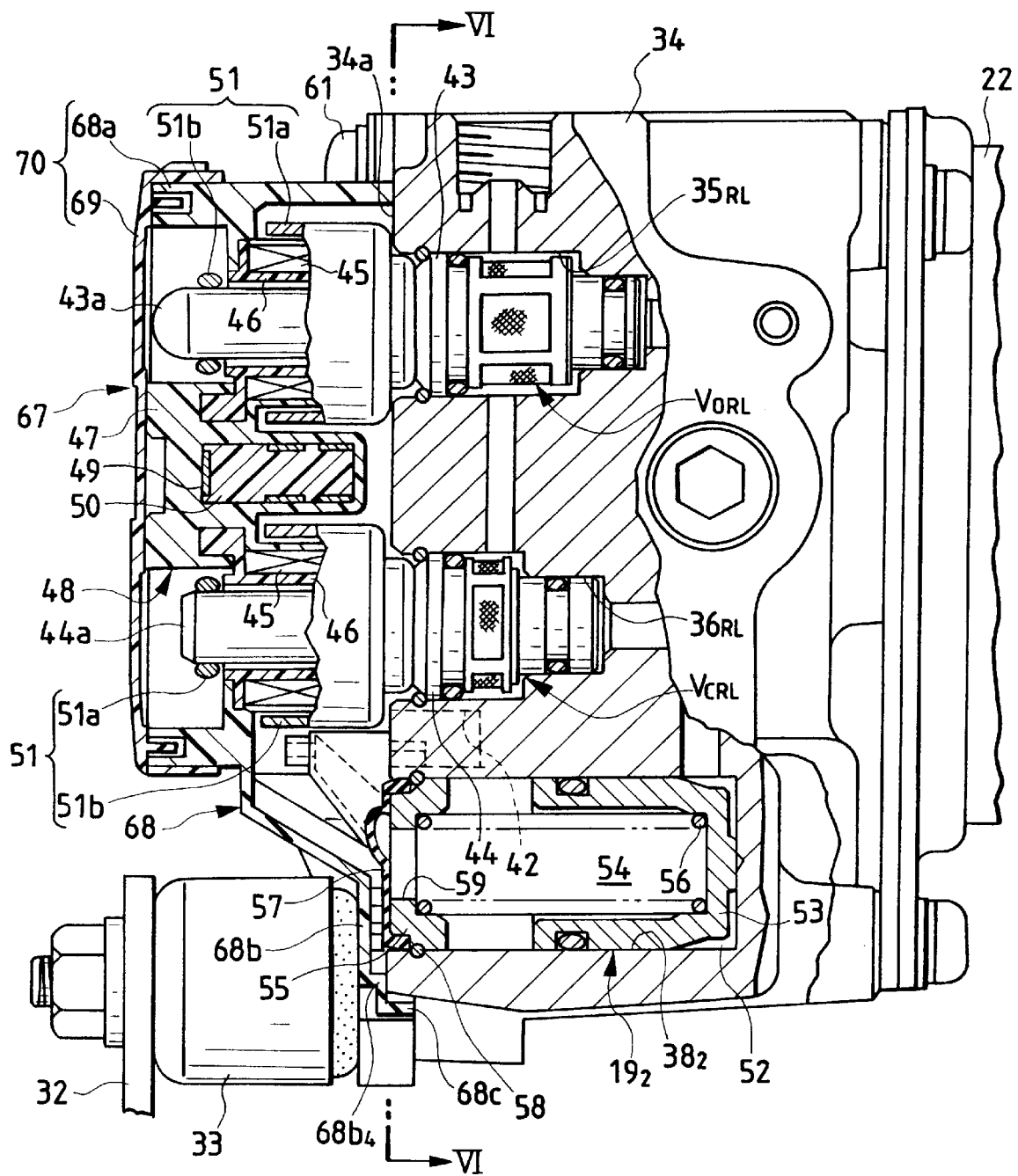
FIG. 4 is a side view, with parts cut away, taken in the direction of the arrows substantially along line IV—IV in FIG. 3.
Figure 5:
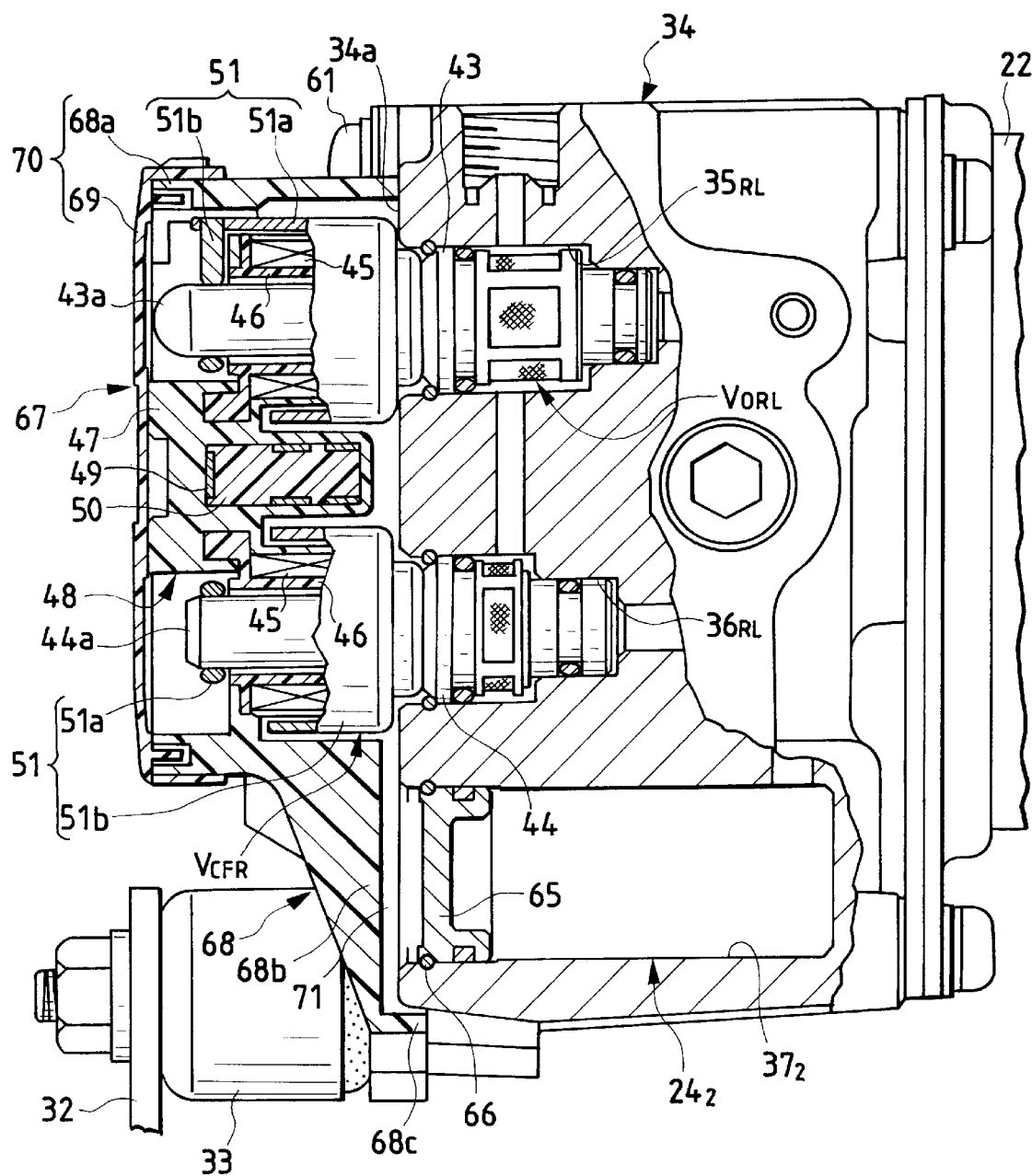
FIG. 5 is a side view, with parts cut away, taken in the direction of the arrows substantially along line V—V in FIG. 3.

Referring to FIGS. 4 and 5 in addition to FIGS. 1 through 3, the four normally opened electromagnetic valves $V_{OFL}$, $V_{ORR}$, $V_{ORL}$ and $V_{OFR}$, the four normally closed electromagnetic valves $V_{CFL}$, $V_{CRR}$, $V_{CRL}$ and $V_{CFR}$, and the pair of dampers $24_1$ and $24_2$ are fixedly inserted into the base 34 through the face 34a. The motor 22 is mounted on another face 34b of the base 34, and the pair of plunger pumps $21_1$ and $21_2$ driven by the motor 22 are built in the base 34.

The valve housings 43 of the normally opened electromagnetic valves $V_{OFL}$, $V_{ORR}$, $V_{ORL}$ and $V_{OFR}$ are fixedly engaged with the engaging recesses $35_{FL}$, $35_{RR}$, $35_{RL}$ and $35_{FR}$, respectively, in such a manner that guide cylinders 43a coupled to the valve housings 43 are protruded from the face 34a of the base 34. Similarly, the valve housings 44 of the normally closed electromagnetic valves $V_{CFL}$, $V_{CRR}$, $V_{CRL}$ and $V_{CFR}$ are fixedly engaged with the engaging recess $36_{FL}$, $36_{RR}$, $36_{RL}$ and $36_{FR}$, respectively, in such a manner that guide cylinders 44a coupled to the valve housing 44 are protruded from the face 34a of the base 34.

The guide cylinders 43a of the valve housings 43, and the guide cylinders 44a of the valve housings 44 are inserted into bobbins 46 on which coils 45 are wound, respectively. The coils 45 and the bobbins 46 are embedded in a molding portion 47 made of synthetic resin so that they are provided as a coil unit which is common to all the normally opened electromagnetic valves $V_{OFL}$, $V_{ORR}$, $V_{ORL}$ and $V_{OFR}$ and to all the normally closed electromagnetic valves $V_{CFL}$, $V_{CRR}$, $V_{CRL}$ and $V_{CFR}$. In addition, a conductor supporting member 50, in which conductors 49 connected to the coils 45 are arranged, is embedded in the molding portion 47.

Further, magnetic path forming frames 51 are fitted in the parts of the molding portion 47 which correspond to the bobbins 46, respectively, in such a manner that they surround the coils 45 wound on the bobbins 46. Those magnetic path forming frames 51 are to magnetically couple the front end portions and the base end portions of the guide cylinders 43a and 44a to each other. Each of the magnetic path forming frames 51 includes a bottomed-cylinder-shaped magnetic cylinder 51a and a magnetic path board 51b which are coupled to each other. The bottomed-cylinder-shaped magnetic cylinder 51a surrounds the part of the molding portion 47 where the coil 45 is provided, in such a manner that its closed end into which the base end portion of the guide cylinder 43a or 44a are inserted are held on the side of the base 34. The front end portion of the guide cylinder 43a or 44a are inserted into the magnetic path board 51b.

The molding portion 47 is formed integrally with the cover body 68 of a cover 67. The cover 67 is fastened to the base 34 in such a manner that it covers the face 34 of the base 34 substantially in its entirety. As shown in FIG. 3, the face 34a of the base 34 has: a threaded hole $60_1$ located obliquely outwardly of the engaging recesses $35_{FL}$ and $35_{RR}$, and a threaded hole $60_1$ located obliquely outwardly of the engaging recesses $35_{RL}$ and $35_{FR}$; and a threaded hole $60_2$ located among the engaging recesses $36_{FL}$ and $36_{RR}$, the damper holer $37_1$ and the reservoir hole $38_1$, and a threaded hole $60_2$ located among the engaging recesses $36_{RL}$ and $36_{FR}$, the damper hole $37_2$ and the reservoir hole $38_2$. The cover 67 is fixedly fastened to the face 34a of the base 34 by engaging bolts 61 with those threaded holes $60_1$, $60_1$, $60_2$ and $60_2$.

As shown in FIG. 4, the reservoir $19_2$ includes: a piston 53; a plug member 55; a return spring 56; and a seal member 57. The piston 53 is slidably inserted into the reservoir hole $38_2$ while forming a reservoir chamber 52 with the closed end of the reservoir hole $38_2$. The plug member 55 is engaged with the opening of the reservoir hole $38_2$ while forming an outside air communicating chamber 54 with the piston 53. The return spring 56 is set in the outside air communicating chamber 54 in such a manner that it is interposed between the plug member 55 and the piston 53. The seal member 57 is fitted in the opening of the reservoir hole $38_2$ in such a manner that it is located outside the plug member 55.

A retaining ring 58 is fitted in the opening of the reservoir hole $38_2$ in such a manner that it is engaged with the periphery of the plug member 55 from outside, to prevent the plug member 55 from coming off the reservoir hole $38_2$. A ventilating hole 59 is formed in the plug member 55 at the center; that is, it is communicated with the outside air communicating chamber 54.

The reservoir $19_1$ is fundamentally equal in construction to the above-described reservoir $19_2$, and it is fixedly inserted into the reservoir hole $38_1$.

The damper $24_2$, as shown in FIG. 5, is formed by closing the opening of the damper hole $37_2$ liquid-tight with a plug 65. More specifically, the plug 65 is engaged with the opening of the damper hole $37_2$, and a retaining ring 66 is fitted in the opening of the damper hole $37_2$ to engage with the periphery of the plug 65 from outside.

The damper $24_1$ is fundamentally equal in construction to the above-described damper $24_2$, and it is fixedly inserted into the damper hole $37_1$.

Figure 6:
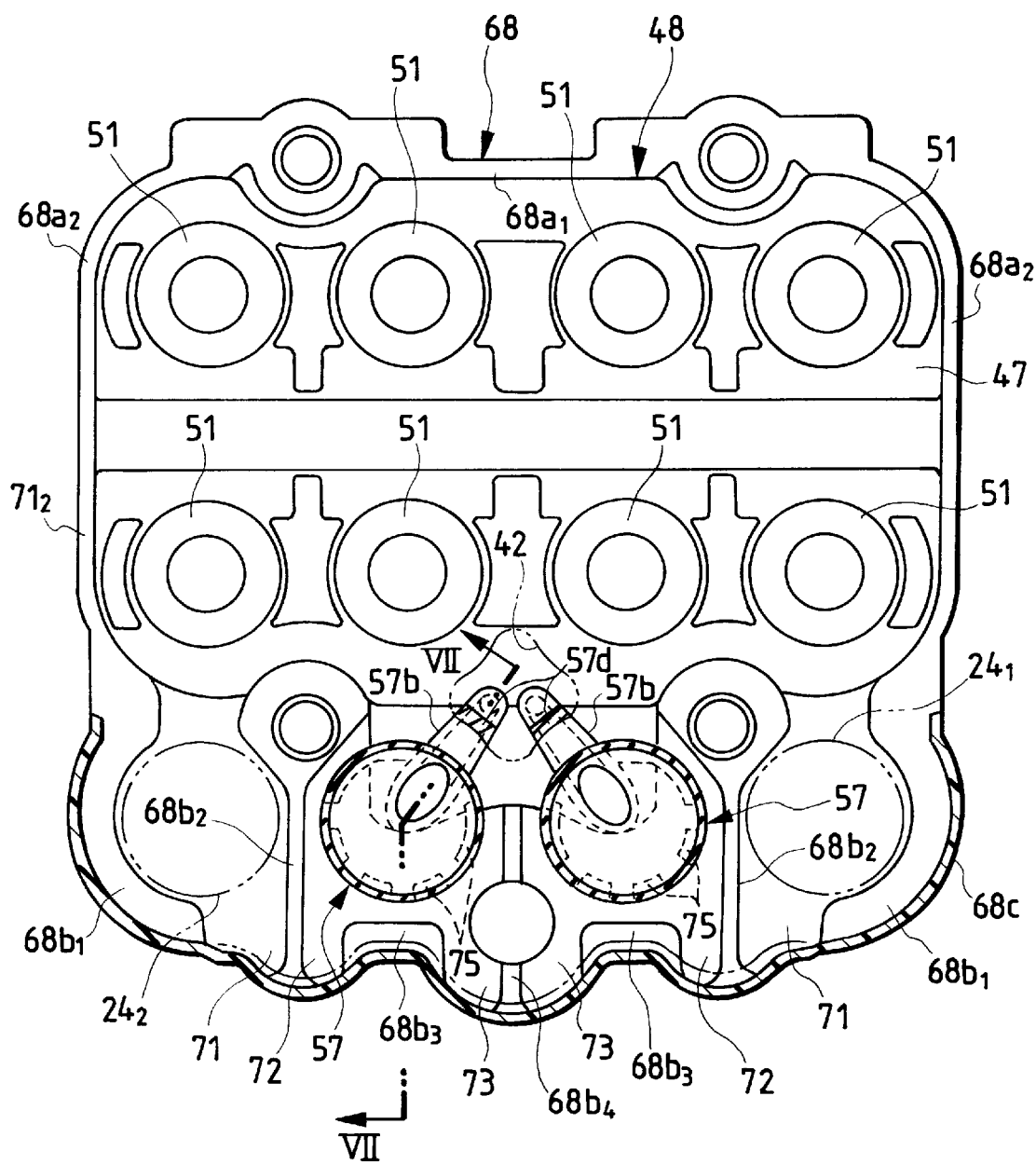
FIG. 6 is a bottom view of a cover taken in the direction of the arrows substantially along line VI—VI in FIG. 4.

Referring to FIG. 6 in addition to FIGS. 1 through 5, the cover 67 includes: a cover body 67 made of synthetic resin; and a lid member 69 made of synthetic resin which is detachably coupled to the cover body 68. The cover body 68 includes: a rectangular frame 68a which surrounds all the normally opened electromagnetic valves $V_{OFL}$, $V_{ORR}$, $V_{ORL}$ and $V_{OFR}$ and all the normally closed electromagnetic valves $V_{CFL}$, $V_{CRR}$, $V_{CRL}$ and $V_{CFR}$ and is integrated with the molding portion 47; and a skirt portion 68b which is formed integrally with the frame 68a and covers the two reservoirs $19_1$ and $19_2$ and the two dampers $24_1$ and $24_2$. The lid member 69 is detachably mounted on the frame 48a. Since the frame 68a and the lid member 69 are adapted to cover all the normally opened electromagnetic valves $V_{OFL}$, $V_{ORR}$, $V_{ORL}$ and $V_{OFR}$ and all the normally closed electromagnetic valves $V_{CFL}$, $V_{CRR}$, $V_{CRL}$ and $V_{CFR}$, the frame 68a and the lid member 69 are formed as a box-shaped portion 70 which is relatively large in volume. The skirt portion 68b is provided in such a manner that it is adjacent to the face 34a of the base 34 and is formed integrally with the frame 68a.

The frame 68a of the cover body 68 includes the upper abutting surface $68a_1$ which is extended horizontally along the upper edge of the frame 68, and a pair of side abutting surfaces $68a_2$ and $68a_2$ which are extended vertically along the right and left edges of the frame 68a. When the cover body 68 is fastened to the base 34, those abutting surfaces $68a_1$ and $68a_2$ are abutted against the face 34a of the base 34. The skirt portion 68b of the cover body 68 includes: a pair of side abutting surfaces $68b_1$ and $68b_1$ which are extended from the side abutting surfaces $68a_2$ and $68a_2$ along the right and left edges of the skirt portion 68b; a pair of ribs $68b_2$ and $68b_2$ which are extended vertically between the damper $24_1$ and the reservoir $19_1$ and between the damper $24_2$ and the reservoir $19_2$, respectively; a pair of low abutting surfaces $68b_3$ and $68b_3$ positioned below the reservoirs $19_1$ and $19_2$, respectively; and a rib $68b_4$ which is extended vertically between the lower abutting surfaces $68b_3$ and $68b_3$. When the cover body 68 is coupled to the base 34, the side abutting surfaces $68b_1$, the ribs $68b_2$, the lower abutting surfaces $68b_3$, and the rib $68_4$ are abutted against the face 34a of the base 34.

A flange 68c is extended from the lower edge of the skirt portion 68b in such a manner that it is in parallel with the lower surface of the base 34. A gap is formed between the flange 68c and the lower surface of the base 34 as indicated by the chain line in FIG. 6, and several drains are formed in such a manner that they are communicated with the gap as follows: That is, drains 71 and 71 are formed between the side abutting surface $68b_1$ and the rib $68b_2$ and between the side abutting surface $68b_1$ and the rib $68b_2$, respectively; drains 72 and 72 are formed between the rib $68b_2$ and the lower abutting surface $68b_3$ and between the rib $68b_2$ and the lower abutting surface $68b_3$, respectively; and drains 73 and 73 are formed between the rib $68b_4$ and the lower abutting surface $68b_3$ and between the rib $68b_4$ and the lower abutting surface $68b_3$, respectively.

Figure 8:
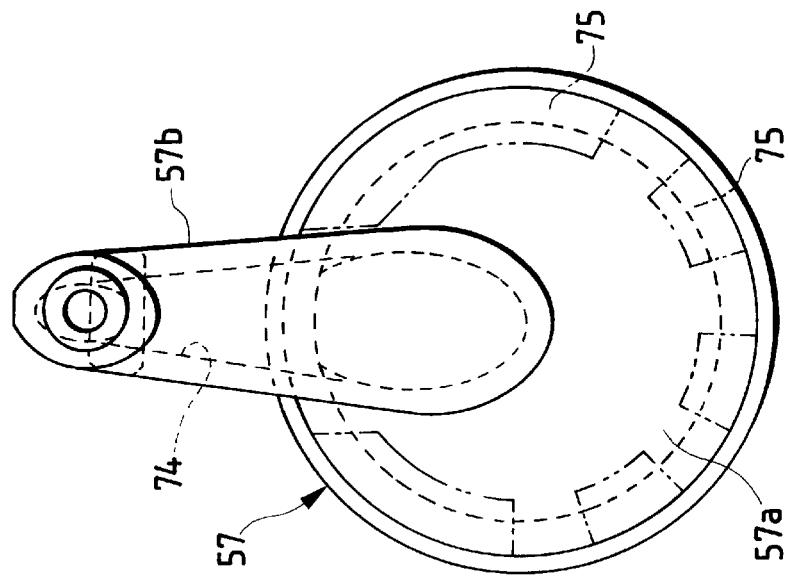
FIG. 8 is a plan view of a seal member taken in the direction of arrow VIII in FIG. 7.
Figure 7:
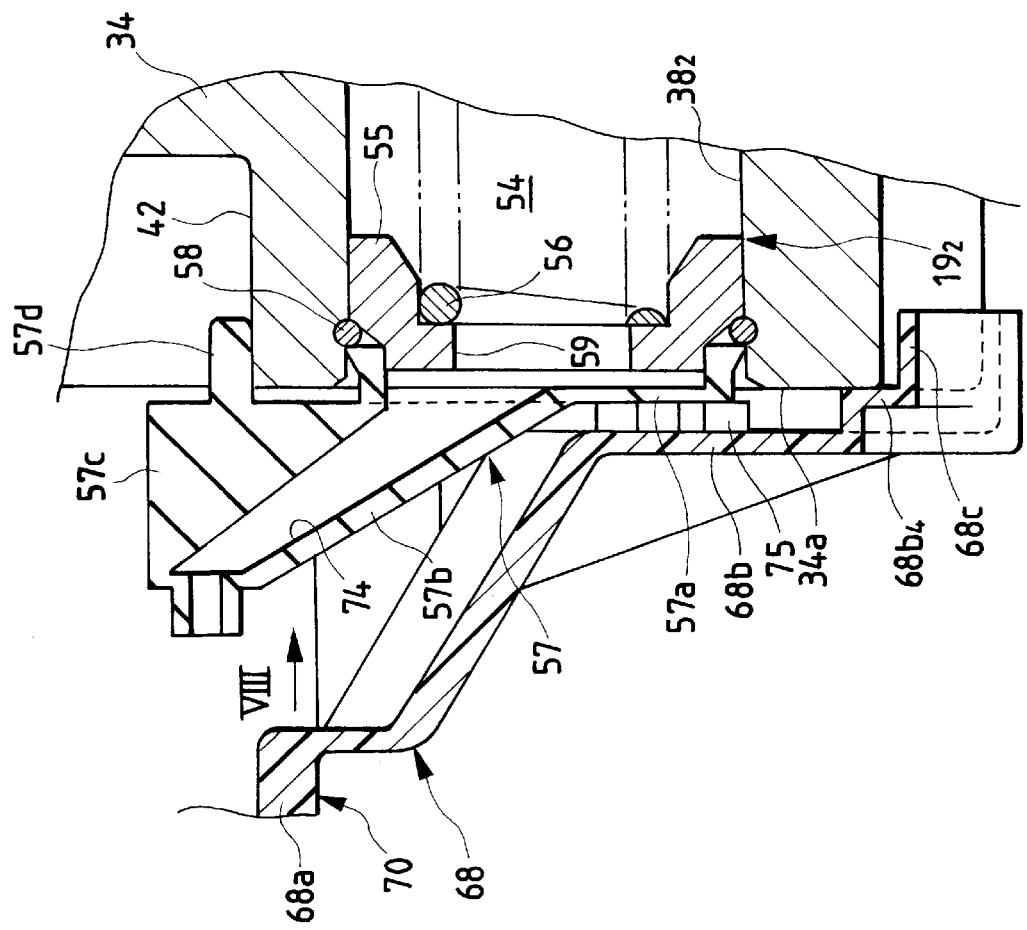
FIG. 7 is a sectional view of part of a reservoir taken along line VII—VII in FIG. 6.

As shown in FIGS. 7 and 8 the seal members 57 of the reservoirs $19_1$ and $19_2$ are made of elastic material such as rubber. Each of the seal members 57 includes: a plate-shaped portion 57a which is engaged with the reservoir hole ($38_1$ or $38_2$) and positioned outside the plug member 55; a ventilating pipe 57b which is extended from the plate-shaped portion 57a in such a manner that it forms a ventilating passageway 74 which is communicated with the ventilating hole 59 of the plug member 55; a reinforcing portion 57c which is connected between the ventilating pipe 57b and the plate-shaped portion 57a; and an engaging protrusion 57d which is extended from the reinforcing portion 57c towards the base 34.

The ventilating pipe 57b whose one end is communicated with the ventilating hole 59 of the plug member 55, is extended from the plate-shaped portion 57a in such a manner that the other end is opened in the relatively large box-shaped portion 70 in the direction which is opposite to the direction in which the face 34a of the base 34 is located. More specifically, the ventilating pipe 57b is extended from the plate-shaped portion 57a while forming an angle with the face 34a of the base 34. In order to prevent the seal member 57 from turning about the axis of the reservoir hole ($38_1$ or $38_2$), the aforementioned engaging protrusion 57d is engaged with the lightening recess 41 formed in the base 34.

In order to prevent the seal member 57 from coming off the reservoir hole ($38_1$ or $38_2$), the skirt portion 68b of the cover 67 has a plurality of protrusions 75 along the outer periphery of the plate-shaped portion 57a in such a manner that they are confronted with the plate-shaped portion 57a.

Now, the function of the above-described embodiment will be described.

The cover 67 includes the rectangular frame 68a which surrounds the normally opened electromagnetic valves $V_{OFL}$, $V_{ORR}$, $V_{ORL}$ and $V_{OFR}$ and the normally closed electromagnetic valves $V_{CFL}$, $V_{CRR}$, $V_{CRL}$ and $V_{CFR}$, and the skirt portion 68b which is integrated with the frame 68a and is adapted to cover the reservoirs $19_1$ and $19_2$ and the dampers $24_1$ and $24_2$. That is, the two reservoirs $19_1$ and $19_2$, and the two dampers $24_1$ and $24_2$ can be covered with the cover 67 which covers the normally opened electromagnetic valves $V_{OFL}$, $V_{ORR}$, $V_{ORL}$ and $V_{OFR}$ and the normally closed electromagnetic valves $V_{CFL}$, $V_{CRR}$, $V_{CRL}$ and $V_{CFR}$. Hence, it is unnecessary to additionally provide a special cover to cover the reservoirs $19_1$ and $19_2$ and the dampers $24_1$ and $24_2$; that is, as described above, the reservoirs and the dampers can be covered with the cover 67 which is directly coupled to the face 34a of the base 34. This feature contributes to a reduction in the weight of the hydraulic pressure controller.

Further as described before, the coils 45 and the bobbins 46 are embedded in the molding portion 47 made of synthetic resin, thus being formed as the coil unit 48 which is common to all the normally opened electromagnetic valves $V_{OFL}$, $V_{ORR}$, $V_{ORL}$ and $V_{OFR}$ and all the normally closed electromagnetic valves $V_{CFL}$, $V_{CRR}$, $V_{CRL}$ and $V_{CFR}$. The coil unit 48 is integrated with the frame 68a of the cover 67. Hence, when the cover 67 is coupled to the base 34, the assembling of all the normally opened electromagnetic valves $V_{OFL}$, $V_{ORR}$, $V_{ORL}$ and $V_{OFR}$ and all the normally closed electromagnetic valves $V_{CFL}$, $V_{CRR}$, $V_{CRL}$ and $V_{CFR}$ is accomplished, while the reservoirs $19_1$ and $19_2$ and the dampers $24_1$ and $24_2$ are covered therewith. This feature contributes to an improvement in the assembling efficiency of the device.

No seal members are arranged on the coupling surfaces of the base 34 and the cover 67. Hence, water entering the inside of the cover 67 through the upper abutting surface $68a_1$ and the side abutting surfaces $68a_2$ and $68a_2$ of the cover 67 is allowed to flow down the face 34a of the baser thus being discharged outside through the drains 71, 71, 72, 72, 73 and 73. In this case, in the cover 67, the gaps between the skirt portion 68b and the reservoirs $19_1$ and $19_2$ are relatively small.

Therefore, if, in each of the reservoirs $19_1$ and $19_2$, the ventilating pipe 57b is opened towards the skirt portion 68b, then because of the narrow gaps the water may enter the outside air communicating chamber 54 through the ventilating pipe 57b. However, as described above, the ventilating pipe 57*b* is opened in the relatively large box-shaped portion 70 in the direction which is opposite to the direction in which the face 34*a* of the base 34 is located, so that the entrance of water flowing down the face 34*a* into the ventilating pipe 57*b* is minimized. When, on the other hand, for instance water is splashed on the lower portion of the base 34, it may enter the inside of the skirt portion of the cover 67 through the drains 71, 71, 72, 72, 73 and 73; however, since the ventilating pipe 57*b* is opened in the box-shaped portion 70 which is opposite in the direction of extension to the drains 71, 71, 72, 72, 73 and 73, as the outside air communicating chamber 54 breathes the entrance of water into the outside air communicating chamber 54 is minimized. This feature contributes to an improvement in the water-proofing function of the reservoirs $19_1$ and $19_2$.

The skirt portion 68*b* includes the protrusions 75 which are confronted with the plate-shaped portion 57*a* of the seal member 57, which eliminates the difficulty that the seal member 57 is set back from the reservoir $38_1$ or $38_2$ to thereby lower the water-proofing function of the reservoirs; that is, the seal member 57 is positively retained in position.

As described above, in the hydraulic pressure controller, the cover includes: the frame which is coupled to the face of the base while surrounding the electromagnetic valves; and the skirt portion which is integrated with the frame, and covers the reservoirs and the dampers, and the coil unit which is formed by embedding the bobbins on which the coils have been wound in the molding portion made of synthetic resin, is integrated with the frame, the coil unit being coupled to the magnetic path forming frames. Hence, it is unnecessary to additionally provide a special cover to cover the reservoirs and the dampers, which contributes to a reduction in the weight of the hydraulic pressure controller. In addition, by fastening the cover to the base, the assembling of the electromagnetic valves is accomplished, while the reservoirs and the dampers are covered. This feature makes it possible to assemble the hydraulic pressure controller with high work efficiency.

Further, in the reservoir water-proofing structure of the invention, on the face of the base, the skirt portion is provided which has the protrusions which are confronted with the seal members and prevent the seal members from coming off the reservoir holes and which is adapted to cover the reservoirs is integrated with a box-shaped portion adapted to cover the plurality of electromagnetic valves, and the seal members have the ventilating pipes, respectively, in such a manner that the first ends of the ventilating pipes are communicated with the ventilating holes of the plug members and the remaining second ends thereof are opened in the direction which is opposite to the direction in which the face of the base is located.

This feature permits the breathing of the outside air communicating chambers, and minimizes the entrance of water into the outside air communicating chambers. In addition, the protrusions of the skirt portion prevent the seal members from coming off the reservoirs.

What is claimed is:

1. A hydraulic pressure controller comprising:

a base;

an electromagnetic valve mounted on the base and including a guide cylinder protruding from the base, a coil unit having a bobbin surrounding the guide cylinder and a coil wound on the bobbin, and a magnetic path forming frame connecting magnetically a first end and a second end of the guide cylinder;

a reservoir and a damper arranged with the electromagnetic valve on the base; and a cover covering the electromagnetic valve, the reservoir and the damper, and including a frame coupled to the base, the frame surrounding the electromagnetic valve, and a skirt portion formed integrally with the frame, the skirt portion covering the reservoir and the damper.

2. The hydraulic pressure controller of claim 1, wherein the coil unit comprises a molding portion made of synthetic resin, the molding portion embedding the coil and the bobbin therein.

3. The hydraulic pressure controller of claim 1, wherein the coil unit is formed integrally with the frame.

4. The hydraulic pressure controller of claim 1, wherein the base includes a reservoir hole having a bottom on a first side, and the reservoir comprises:

a piston slidably fitted in the reservoir hole;

a plug member fitted in the reservoir hole, the plug member having an air communicating chamber between the piston and the plug member and a ventilating hole communicated with the air communicating chamber; and a seal member fitted in the reservoir hole to prevent water from entering the air communicating chamber and to permit air to enter the air communicating chamber, wherein the seal member includes a ventilating pipe having a first pipe end which is connected to the ventilating hole and a second pipe end which is opened in a second side opposite to the first side.

5. The hydraulic pressure controller of claim 4, wherein the skirt portion has a protrusion in the cover, the protrusion being confronted with the seal member to pre-vent the seal member from coming off the reservoir hole.

6. The hydraulic pressure controller of claim 4, wherein the reservoir comprises a reservoir chamber formed between the piston and the bottom of the reservoir hole, and a return spring held in the air communicating chamber to urge the piston in a direction of reducing volume of the reservoir chamber.

\* \* \* \* \*